United States Patent
Mallmann

(10) Patent No.: US 10,663,021 B2
(45) Date of Patent: May 26, 2020

(54) DISC BRAKE FOR A MOTOR VEHICLE AND BRAKE PAD ASSEMBLY THEREFOR

(71) Applicant: Lucas Automotive GmbH, Koblenz (DE)

(72) Inventor: Markus Mallmann, Pfalzfeld (DE)

(73) Assignee: Lucas Automotive GmbH, Koblenz (DE)

( * ) Notice: Subject to any disclaimer, the term of this patent is extended or adjusted under 35 U.S.C. 154(b) by 146 days.

(21) Appl. No.: 15/735,655

(22) PCT Filed: Jun. 7, 2016

(86) PCT No.: PCT/EP2016/062874
§ 371 (c)(1),
(2) Date: Dec. 12, 2017

(87) PCT Pub. No.: WO2016/198386
PCT Pub. Date: Dec. 15, 2016

(65) Prior Publication Data
US 2018/0355932 A1 Dec. 13, 2018

(30) Foreign Application Priority Data
Jun. 12, 2015 (DE) .......... 10 2015 007 523

(51) Int. Cl.
*F16D 65/097* (2006.01)
*F16D 65/54* (2006.01)
(Continued)

(52) U.S. Cl.
CPC .......... *F16D 65/0972* (2013.01); *B60T 1/065* (2013.01); *F16D 55/2262* (2013.01);
(Continued)

(58) Field of Classification Search
CPC ............. F16D 65/0977; F16D 65/0972; F16D 65/0978; F16D 65/097; F16D 65/0979; F16D 2127/02; F16D 2055/0029
See application file for complete search history.

(56) References Cited

U.S. PATENT DOCUMENTS 7,219,773 B2 * 5/2007 Ono .................... F16D 65/0971
188/250 E
8,376,092 B2 * 2/2013 Lethorn .............. F16D 65/0977
188/72.3
(Continued)

FOREIGN PATENT DOCUMENTS

DE 102012016737 A1 2/2014
EP 2792899 A1 10/2014
(Continued)

OTHER PUBLICATIONS

German Search Report, Application No. DE102015007523.3, dated Jan. 22, 2016.
PCT International Search Report and the Written Opinion, Application No. PCT/EP2016/062874 filed Jun. 7, 2016, dated Sep. 7, 2016.

*Primary Examiner* — Bradley T King
*Assistant Examiner* — Stephen M Bowes
(74) *Attorney, Agent, or Firm* — MacMillan, Sobanski & Todd, LLC

(57) ABSTRACT

A disc brake for a motor vehicle having a reset device that can only be plastically deformed, as a result of a force acting thereon in the actuation direction along a guide surface of the receiving region, if the reset device has adopted a predetermined, exclusively elastic deformation as a result of this force, wherein the plastically deformable region is formed as a loop and is in direct contact with the retaining tongue and can also roll out along the guide surface during the plastic deformation.

9 Claims, 12 Drawing Sheets

(51) Int. Cl.
*B60T 1/06* (2006.01)
*F16D 55/226* (2006.01)
*F16D 65/00* (2006.01)
*F16D 65/22* (2006.01)
*F16D 55/00* (2006.01)
*F16D 127/02* (2012.01)
*F16D 129/04* (2012.01)

(52) U.S. Cl.
CPC ..... *F16D 65/0068* (2013.01); *F16D 65/0977* (2013.01); *F16D 65/0978* (2013.01); *F16D 65/22* (2013.01); *F16D 65/543* (2013.01); *F16D 2055/0029* (2013.01); *F16D 2127/02* (2013.01); *F16D 2129/04* (2013.01); *F16D 2200/0004* (2013.01)

(56) References Cited

U.S. PATENT DOCUMENTS

| | | | |
|---|---|---|---|
| 8,397,880 B2 | 3/2013 | Chelaidite | |
| 8,636,119 B2* | 1/2014 | Bach | F16D 65/097 188/72.3 |
| 9,528,564 B2 | 12/2016 | Mallmann | |
| 2011/0168503 A1* | 7/2011 | Chelaidite | F16D 65/0972 188/73.31 |
| 2012/0186918 A1* | 7/2012 | Wakabayashi | F16D 65/0972 188/72.3 |

FOREIGN PATENT DOCUMENTS

| | | | | |
|---|---|---|---|---|
| GB | 2166822 A * | 5/1986 | | F16D 65/0006 |
| WO | 2016/124389 A1 | 8/2016 | | |

* cited by examiner

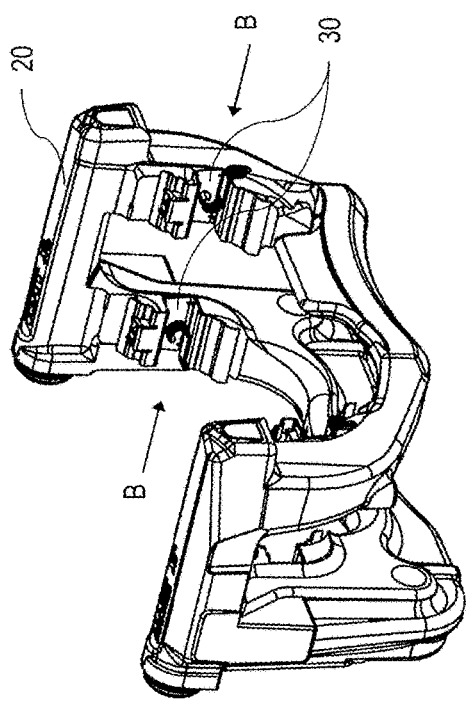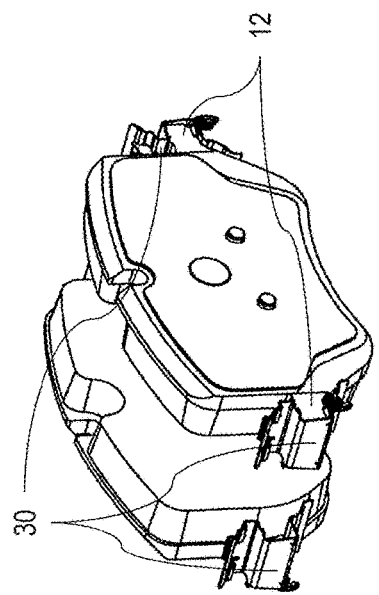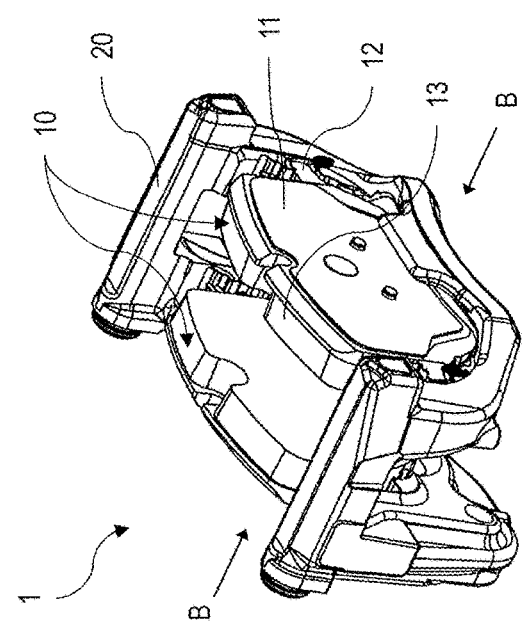

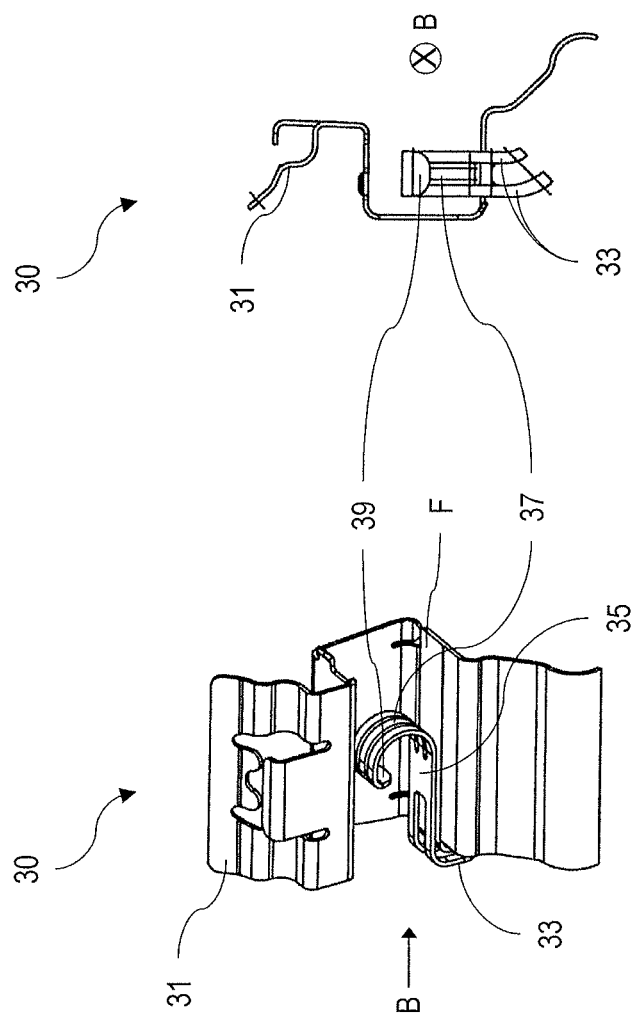
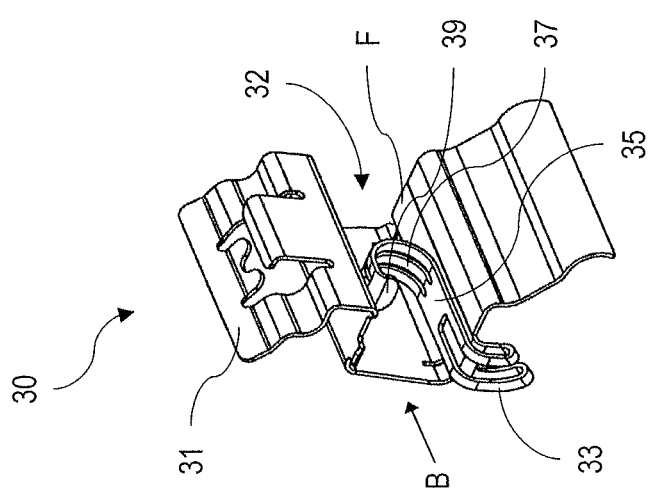

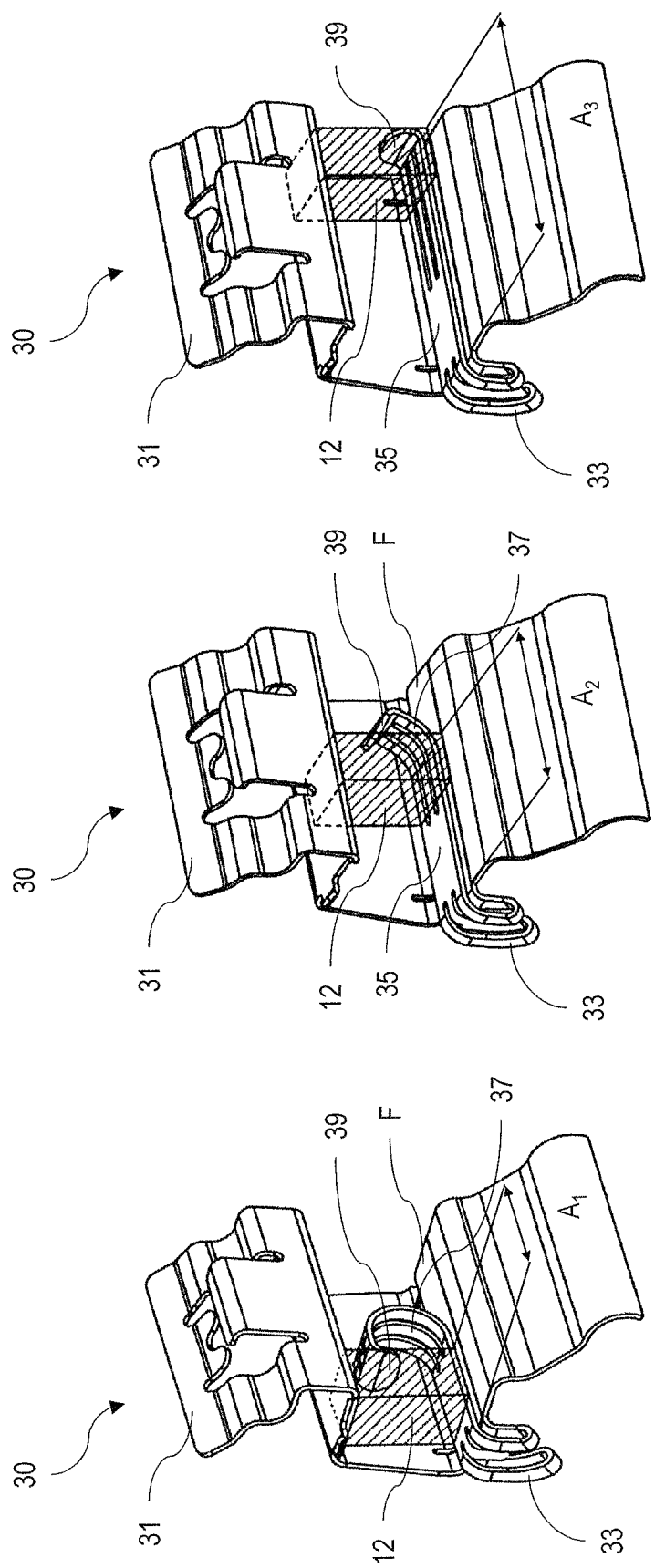

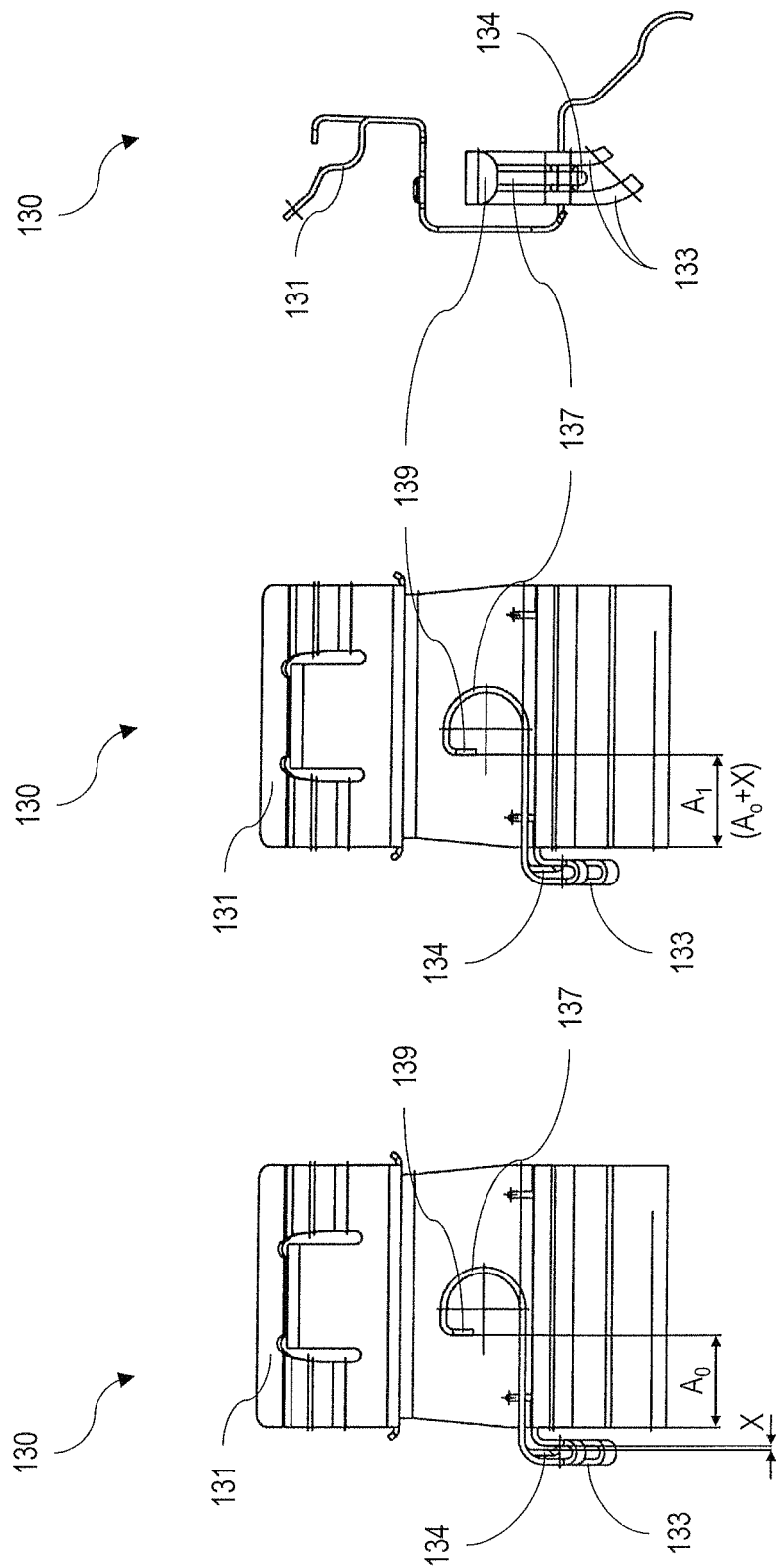

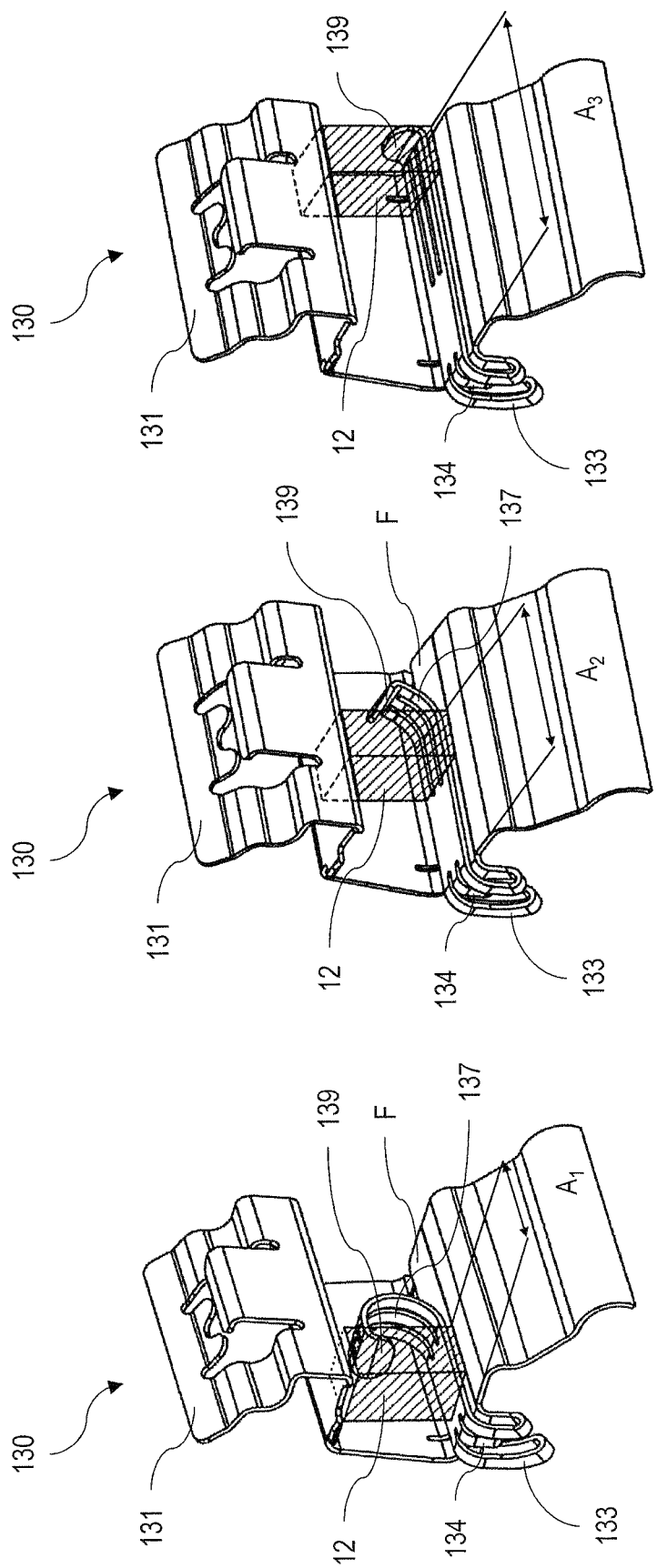

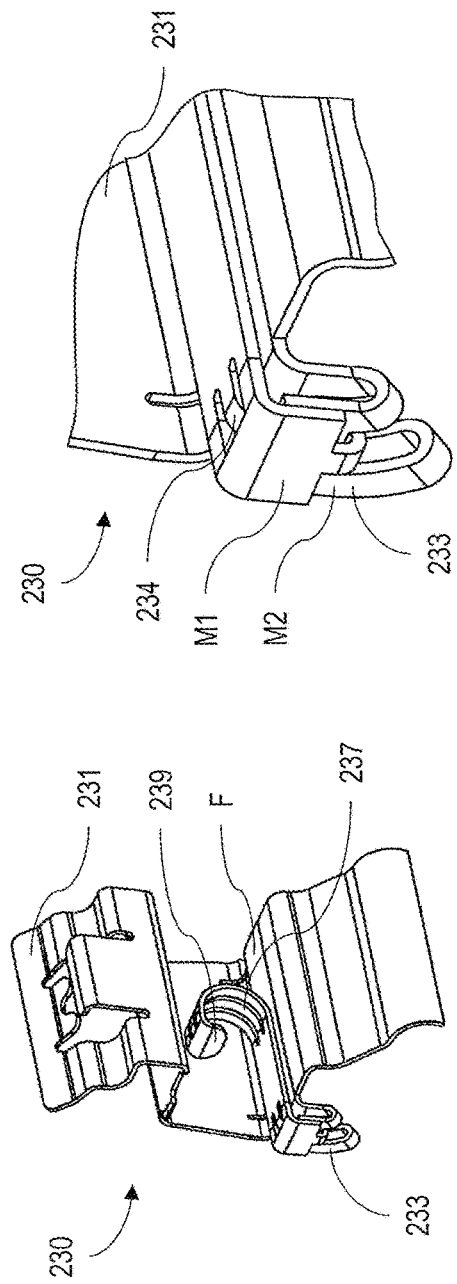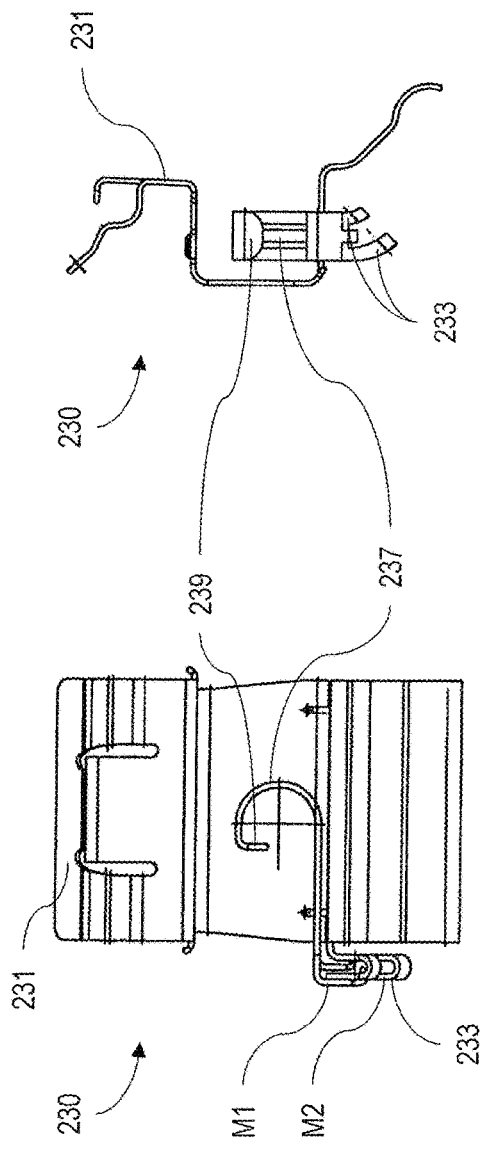

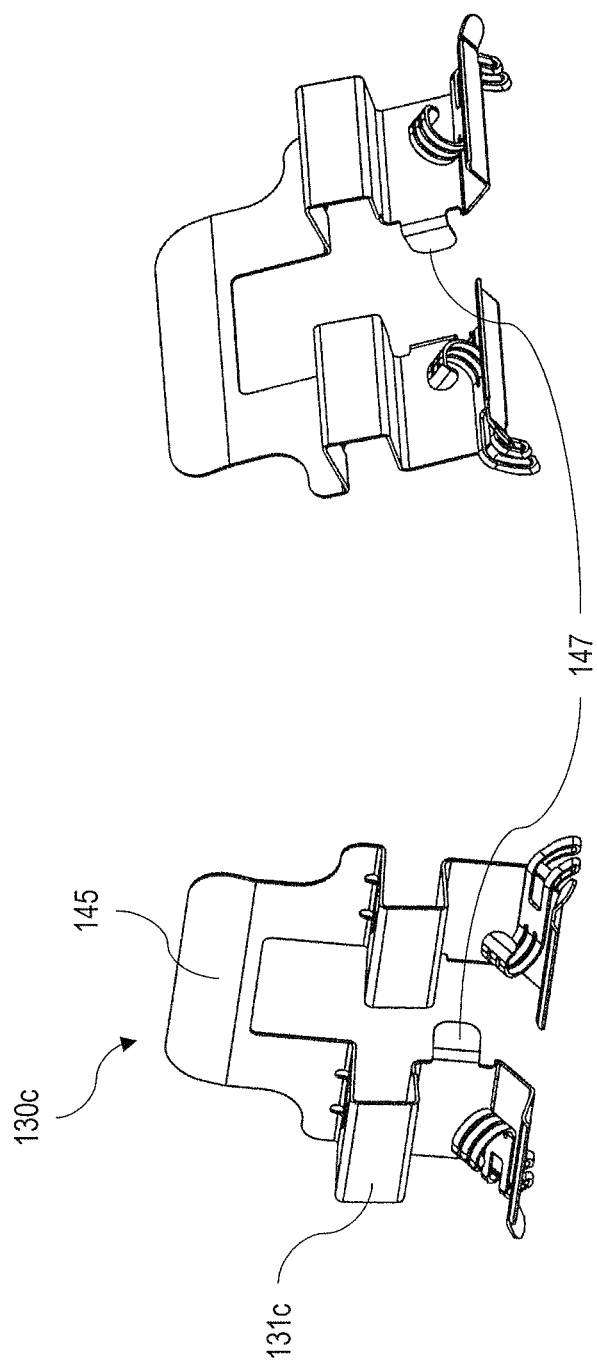

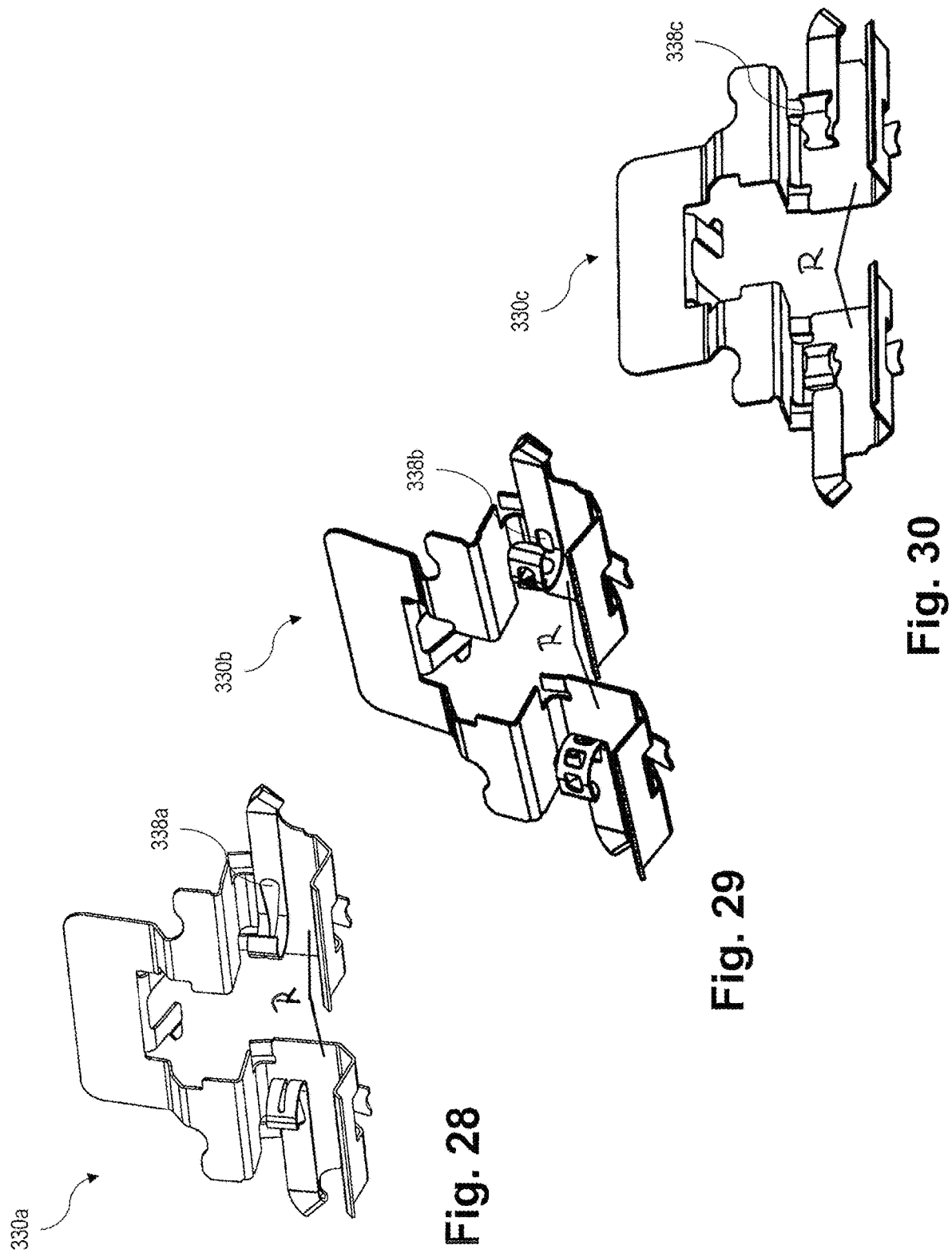

US 10,663,021 B2

DISC BRAKE FOR A MOTOR VEHICLE AND BRAKE PAD ASSEMBLY THEREFOR

CROSS-REFERENCE TO RELATED APPLICATIONS

This application is a national stage of International Application No. PCT/EP2016/062874, filed 7 Jun. 2016, the disclosures of which are incorporated herein by reference in entirety, and which claimed priority to German Patent Application No. 10 2015 007 523.3, filed 12 Jun. 2015, the disclosures of which are incorporated herein by reference in entirety.

BACKGROUND OF THE INVENTION

The present invention relates to a disc brake for a motor vehicle and in particular to a disc brake comprising a guide, in which at least one brake pad assembly is guided movably in a braking manner, wherein the brake pad assembly comprises a brake pad carrier, to which a vehicle brake pad is attached, which can be brought into interaction with a brake disc for achieving a braking effect, wherein the brake pad carrier has at least one retaining tongue, wherein the guide has at least one receiving region and wherein the retaining tongue can be accommodated, guided in an actuation direction, in the at least one receiving region, wherein a reset device is in contact with the at least one retaining tongue, via which reset device a reset force acting opposite to the actuation direction as a result of an elastic deformation due to braking deflection of the brake pad assembly can be applied to this and wherein the reset device has an elastically deformable region for resetting the brake pad carrier and a following plastically deformable region for permanent adaptation to wear of the vehicle brake pad.

Disc brakes of this kind are known from the prior art. Thus the document DE 10 2012 016 737 A1, for example, shows a disc brake, which has a reset device in the form of a reset spring. This reset spring has two curved regions shown in FIG. 6, which can each be elastically deformed in normal operation of the disc brake to reset the brake pad assembly and can each be deformed plastically to compensate for brake pad wear. In said document one and the same regions consequently serve both as elastically deformable regions for resetting and as plastically deformable regions for wear compensation.

The document U.S. Pat. No. 8,397,880 B2 also provides for such a functional connection of resetting and wear compensation and shows in particular in FIGS. 8A and 8B a likewise curved region in the reset device shown, which region serves as an elastically deformable region for resetting and as a plastically deformable region for wear compensation.

In systems of this kind with elastic and plastic deformation of one and the same region, impairment of the resetting of the brake pads can occur in particular in the case of heavy wear that is to be compensated for.

BRIEF SUMMARY OF THE INVENTION

A feature of the present invention is therefore to provide a disc brake and a brake pad assembly in which wear compensation has no effect on the reset properties.

This feature is achieved by a disc brake for a motor vehicle of the type described at the beginning that the reset device, preferably the plastically deformable region, is only then plastically deformable due to a force acting on it in the actuation direction along a surface of the receiving region [reset device can be fitted to all surfaces of the guide] if the reset device, preferably the elastically deformable region, has assumed a predetermined, exclusively elastic deformation due to this force. Plastic deformation thus occurs according to the invention even when the degree of elastic deformation available has been completely exhausted.

The invention provides in particular that the plastically deformable region is formed in the form of a loop, i.e. loop-shaped, and is in direct contact with the retaining tongue and is able to roll out along the respectively associated surface in the plastic deformation. The continuing plastic deformation available for wear compensation can be increasingly inhibited by this, to be precise to the extent that in the case of a defined deformation path along the surface, which corresponds e.g. to the wear limit of the brake pads, no further plastic deformation can ultimately take place.

The plastically deformable region is preferably also the elastically deformable region at the same time, wherein preferably recesses along one longitudinal direction of the region define the deformability. The deformability here defines the reset properties, such as the extent of the reset forces, for example, and the speed of the reset.

Alternatively the elastically deformable region extends in a different direction from the plastically deformable region. The installation space required by the reset device inside the disc brake can be reduced in this way. Furthermore, the direction of the active forces of both regions can be selected thereby for better separation of reset and wear compensation.

The elastically deformable region can basically be formed one-armed or two-armed. For individual adjustment of the spring curve for the elastic deformation, the elastically deformable region can have at least two formed projections. These can have identical or different lengths.

A development of the invention provides that the reset device has a stop, which is provided to limit the spring path of the elastically deformable region, so that each further movement of the retaining tongue in the actuation direction leads to a plastic deformation of the plastically deformable region. Such a stop causes an abrupt increase in the stiffness of the elastically deformable region, which in turn initiates the plastic deformation of the plastically deformable region for wear compensation.

An improvement in the manufacture and/or maintenance of a disc brake according to the invention is achieved according to the invention, for example, in that the reset device has at least two elements actively connected to one another, wherein one element has only the plastically deformable region. The elastically deformable region and the plastically deformable region can be manufactured more simply in this way. Furthermore, following wear compensation and an exchange of the worn brake pad for a new brake pad, only the element with the plastically deformable region is exchanged.

The invention advantageously provides that for the plastic deformation of the plastically deformable region, the retaining tongue slides along this, so that the region is reshaped corresponding to its contact surface with the retaining tongue. The contact surface is preferably the surface of the retaining tongue lying opposite this, with which the retaining tongue rests on the plastically deformable region. An installation space saving is achieved in this way, as a synergy occurs between retaining tongue and plastically deformable region during its plastic deformation.

A maximum wear compensation can be determined precisely by the retaining tongue engaging directly on the end section of the plastically deformable region, which section limits the movement of the retaining tongue in the actuation direction following complete plastic deformation due to form closure with the retaining tongue. In this state the brake pads can be prevented from experiencing excessive wear, which can lead to inadequate functioning up to an undesirable sliding off of the pads into the gap between brake disc and brake carrier.

In particular, the reset device can be formed of sheet metal according to the invention, which has a projecting, elastically deformable and loop-shaped region as well as a following plastically deformable region protruding into the receiving region, wherein recesses in the metal sheet define the elastic and plastic deformability. A compact structure is achieved in this way, utilizing the space available for guiding of the retaining tongue.

The invention further relates to a brake pad assembly for a disc brake wherein the brake pad assembly has a brake pad carrier, to which a vehicle brake pad is attached, which can be brought into interaction with a brake disc for achieving a braking effect, wherein the brake pad carrier has at least one retaining tongue and wherein the guide has at least one receiving region, wherein the retaining tongue can be accommodated, guided in an actuation direction, in the at least one receiving region, wherein a reset device is attached to the at least one retaining tongue, via which reset device a reset force acting opposite to the actuation direction as a result of an elastic deformation due to braking deflection of the brake pad assembly can be applied to this, wherein the reset device has an elastically deformable region for resetting the brake pad carrier and a following plastically deformable region for permanent adaptation to wear of the vehicle brake pad, and wherein the plastically deformable region is only then plastically deformable due to a force acting on it in the actuation direction along a surface of the receiving region if the elastically deformable region has assumed a predetermined, exclusively elastic deformation due to this force.

Two reset devices acting in opposed directions preferably have a common, one-piece basic body. Assembly and disassembly in production and maintenance is made faster and simpler in this way. Such a basic body can be preferably U-shaped and connect the reset devices to one another by a connecting bracket, wherein the connecting bracket serves at the same time for attachment to the brake carrier. Additional attachment extensions are preferably present, which are each directed symmetrically inwards into the U-shaped basic body and are suitable for attachment to the brake carrier.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a spatial representation of a disc brake according to the invention;

FIG. 2 is a spatial representation of the brake carrier of the disc brake according to the invention from FIG. 1 with assembled guides with reset devices;

FIG. 3 is a spatial representation of the brake pad carrier of the disc brake according to the invention from FIG. 1 with retaining tongues;

FIGS. 4, 5 are spatial representations of a first guide shown in FIG. 2 with a reset device according to a first exemplary embodiment;

FIG. 6 is a lateral representation of the first guide with the reset device from FIGS. 4, 5;

FIGS. 9-11 are spatial representations of the first guide with the reset device with retaining tongue resting on the plastically deformable region in three states of plastic deformation: wherein FIG. 9 shows no plastic deformation, FIG. 10 shows medium and FIG. 11 shows maximal plastic deformation;

FIGS. 12, 13 are cross sections of a second guide with a reset device with stop according to a second exemplary embodiment of the invention and in two states of elastic deformation: wherein FIG. 12 shows no elastic deformation and FIG. 13 shows maximal (in contact with the stop) elastic deformation;

FIG. 14 is a lateral representation of the second guide with the reset device from FIGS. 12, 13;

FIGS. 15-17 are spatial representations of the second guide with the reset device with retaining tongue resting on the plastically deformable region in three states of plastic deformation: wherein FIG. 15 shows no plastic deformation, FIG. 16 shows medium and FIG. 17 shows maximal plastic deformation;

FIG. 18 is a spatial representation of a third guide with a reset device according to a third exemplary embodiment with two-piece structure;

FIG. 19 is an enlargement of the connection point shown in FIG. 18 of the two-piece structure of the third reset device;

FIG. 20 is a cross section through the third guide shown in FIGS. 18, 19 with the reset device;

FIG. 21 is a lateral representation of the third guide with the reset device from FIGS. 18-20;

FIGS. 24, 25 are two guides formed in one piece with reset devices;

FIGS. 28-30 are spatial representations of the fifth guide with different recesses in the deformable region of the reset devices.

DETAILED DESCRIPTION OF THE INVENTION

Figure 8:
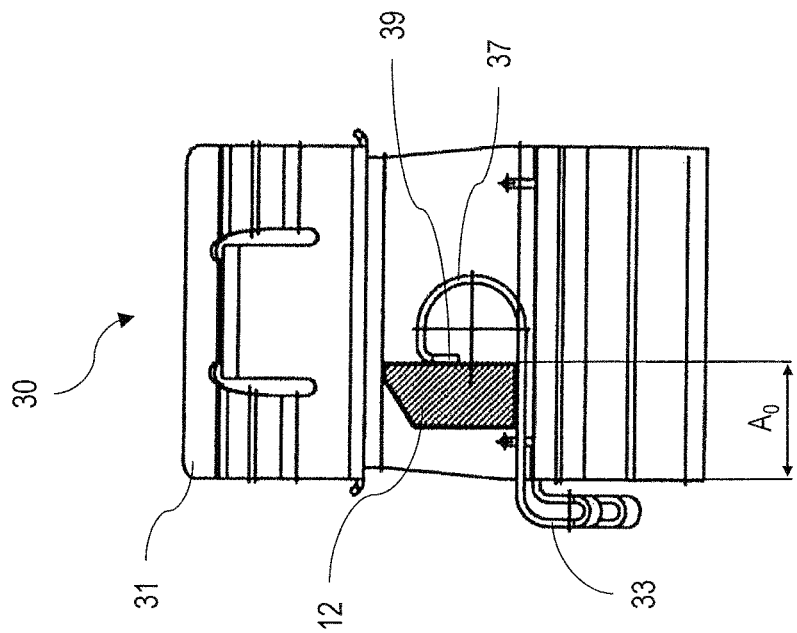
FIG. 8 is an enlargement of the cross section shown in FIG. 7.

The following exemplary embodiments differ substantially from one another with regard to the configuration of their reset devices.

Exemplary Embodiment 1

FIG. 1 shows a disc brake 1 according to the invention for a motor vehicle. Here two opposing brake pad assemblies 10 are to be recognized, which are constructed from a brake pad carrier 11 with lateral retaining tongues 12 and a vehicle brake pad 13. The brake pad assemblies 10 are facing one another on their vehicle brake pad side and are spaced from one another so that a brake disc, which is not shown, can be arranged in between and the vehicle brake pad 13 can be brought into interaction with the brake disc for achieving a braking effect in that the brake pad assemblies 10 are moved in an actuation direction B. This movement in the actuation direction B can be effected in a known manner via a hydraulic actuation mechanism, wherein the brake pad assemblies 10 are held by a brake carrier 20 and are guided movably in a braking manner in this by the retaining tongues 12.

In FIG. 2 the brake pad assemblies 10 have been removed from the disc brake 1. Here guides 30 formed from sheet metal with reset devices are attached to the brake carrier 20.

FIG. 3 shows only the brake pad assemblies 10 from FIG. 1 with the guides 30, which surround the retaining tongues 12 of the brake pad carriers 11 in the illustration.

FIGS. 4 and 5 show two spatial representations of the guides 30. These are formed as sheet metal parts with a basic body 31 and have a U-shaped receiving region 32, in which the retaining tongue 12 can be received guided in and opposite to the actuation direction B. In this case the reset device rests on the retaining tongue 12, via which reset device a reset force acting opposite to the actuation direction B as a result of an elastic deformation due to brake-active deflection of the brake pad assembly 10 is applicable to this.

The reset device 30 has an elastically deformable region 33, which is formed as a loop and projects from the basic body 31 of the guide 30, for resetting of the brake pad carrier 10 as well as a plastically deformable region 37, which connects thereto via a transition region 35 and is formed as a loop, for permanent automatic compensation of a wear of the vehicle brake pad 13. It is to be recognized here that the elastically deformable region 33 extends in a different direction from the plastically deformable region 37. The plastically deformable region 37 projects into the receiving region 32. The properties of the elastic and plastic deformability of the respective regions 33, 37 are defined by recesses or cutouts in the material. Connected to the end of the plastically deformable region 37 as an end section 39 is an engagement lip 39, which is not substantially deformable in operation and serves as a point of force application for the retaining tongue 12 moved in actuation direction B. Furthermore, a surface of the basic body 31 is designated as a guide surface F, along which the transition region 35 extends in parallel, wherein the plastically deformable region 37 is able to roll out along the guide surface F during the plastic deformation.

FIG. 6 shows a side of the guide 30 viewed from the left, i.e. in actuation direction B, in FIGS. 4 and 5. It is to be recognized in this that the elastically deformable region 33 has two arms formed of a different length, which are also curved into the interior of the disc brake 1 in a space-saving manner.

Figure 7:
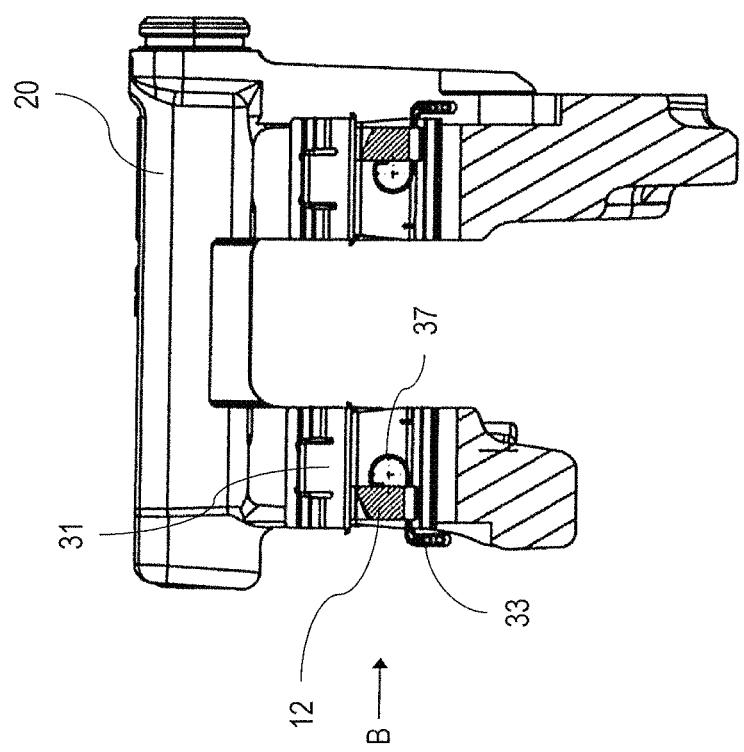
FIG. 7 is a cross section through the disc brake shown in FIG. 1 at the level of the reset device.

FIGS. 7 and 8 show a respective cross section through the guide 30 and the retaining tongue 12 brought into contact with the engagement lip 39. In the state shown in FIG. 8, no elastic or plastic deformation has yet taken place. This state defines a certain guide distance $A_o$ in the resting position, which is measured parallel to the guide surface F from the left edge of the guide surface F, which faces the elastically deformable region 33, as far as the engagement point of the retaining tongue 12 on the engagement lip 39.

FIGS. 9 to 11 indicate the course of the plastic deformation of the plastically deformable region 37 for wear compensation.

In FIG. 9 no plastic deformation of the plastically deformable region 37 has yet taken place, because the guide distance $A_1$ only indicates that the maximal elastic deformation of the elastically deformable region 33 has been reached and any further movement of the retaining tongue 12 in the actuation direction B will lead to a permanent deformation of the plastically deformable region 37. In other words, the plastically deformable region 37 is only then plastically deformable due to a force acting on it in the actuation direction B along a guide surface F of the receiving region 32 when the elastically deformable region 33 has assumed a predetermined, exclusively elastic deformation due to this force and a still further movement of the brake pad is possible in the event of a braking displacement. This case only occurs if the vehicle brake pad 13 concerned is already worn to the extent that a movement of the retaining tongue 12 in the actuation direction B is possible over a longer path than in the case of regular service braking. This "path difference" between a new and a worn vehicle brake pad 13 is thus permanently balanced out or compensated for by the plastic deformation, and the associated displacement of the contact point of the retaining tongue 12 with the engagement lip 39.

It is to be recognized in FIG. 10 that the plastic deformation occurs in that the retaining tongue 12, for plastic deformation of the plastically deformable region 37, slides along this, wherein the region 37 is reshaped by interaction of its contact surface with the retaining tongue 12. In consequence, the guide distance $A_2$ is increased compared with $A_1$. The wear compensation or the "path distance" already mentioned can be calculated by $A_2-A_1$.

FIG. 11 shows the maximal possible compensation, at which the plastically deformable region 37 is quasi completely rolled out along the guide surface F. In this case, following complete plastic deformation the end section 39 limits a further movement of the retaining tongue 12 in the actuation direction B by form closure with the retaining tongue 12.

Exemplary Embodiment 2

The second exemplary embodiment according to FIGS. 12 to 17 differs from the first exemplary embodiment in that the reset device has a stop 134, which is able to limit the spring path X of the elastically deformable region 133, so that each further movement of the retaining tongue 12 in the actuation direction B leads to a plastic deformation of the plastically deformable region 137.

In this context FIGS. 12 and 13 show the two states of the elastically deformable region 133.

In FIG. 12 no elastic deformation has yet taken place, which is why the entire spring path X (>0) is available, which is measured from the inner face, oriented to the right in the figure, of the stop 134 to the opposite stop point. The guide distance in this resting position, which is measured parallel to the guide surface F from the left edge of the guide surface F, which faces the elastically deformable region 133, as far as the engagement point on the engagement lip 139, is designated by $A_0$.

In FIG. 13 this spring path X is already used up due to an actuation of the brake pad assembly 10 and the retaining tongue 12 connected thereto in the actuation direction B (X=0). The stop 134 rests on the opposing stop surface. The guide distance in this state is consequently designated by $A_1$.

FIGS. 15 to 17 show, like FIGS. 9 to 11 of the first exemplary embodiment, the plastic deformation of the plastically deformable region 139, wherein starting out from a guide distance A1 in FIG. 15 the maximal plastic deformability is reached in FIG. 17 at a guide distance of A3.

Exemplary Embodiment 3

The third exemplary embodiment according to one of the FIGS. 18 to 21 differs from the second exemplary embodiment in that the reset device, in addition to a stop 234, has two elements M1, M2, which are formed separately but are actively connected to one another in the state shown, wherein one element M1 only has the plastically deformable region 237.

The reset device shown in FIG. 18 and in FIG. 19 as an enlarged view enables a transition region to be recognized between the elements M1 and M2, wherein the element M1 is hooked into the elastically deformable region 233 of the element M2 by means of a hook and rests on this in the actuation direction B, so that both on actuation and on reset of the brake pad assembly 10, compressive loading and no tensile loading, for example on the hook, prevails. While this exemplary embodiment provides a detachable connection between the elements M1 and M2, an undetachable connection, e.g. due to gluing, soldering or welding, can also be provided.

FIGS. 20 and 21 correspond to the representations of the reset device known from FIGS. 12 and 14 of the second exemplary embodiment, wherein the special feature of the two-piece construction from the elements M1 and M2 is to be recognized.

Figure 23:
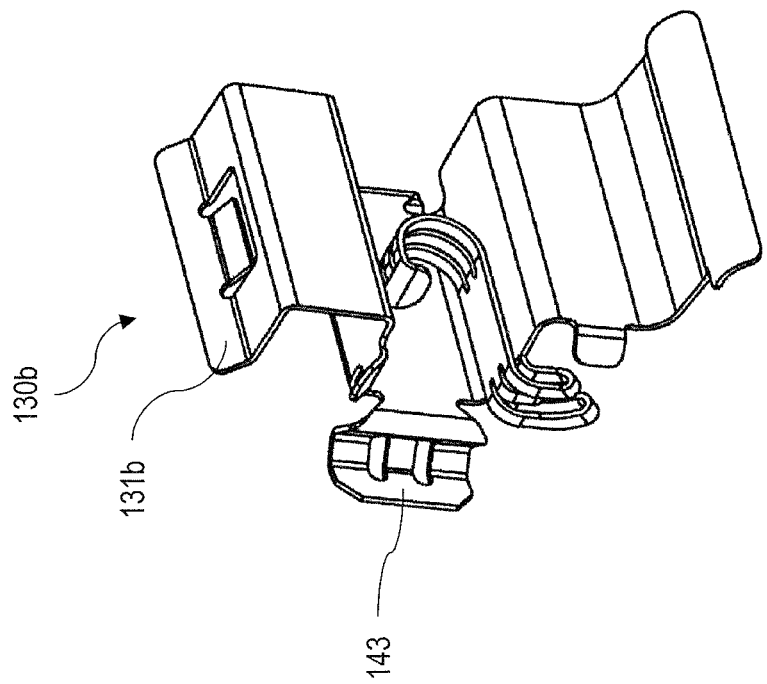
FIGS. 22, 23 are attachment-specific executions of the guide with the reset device.
Figure 22:
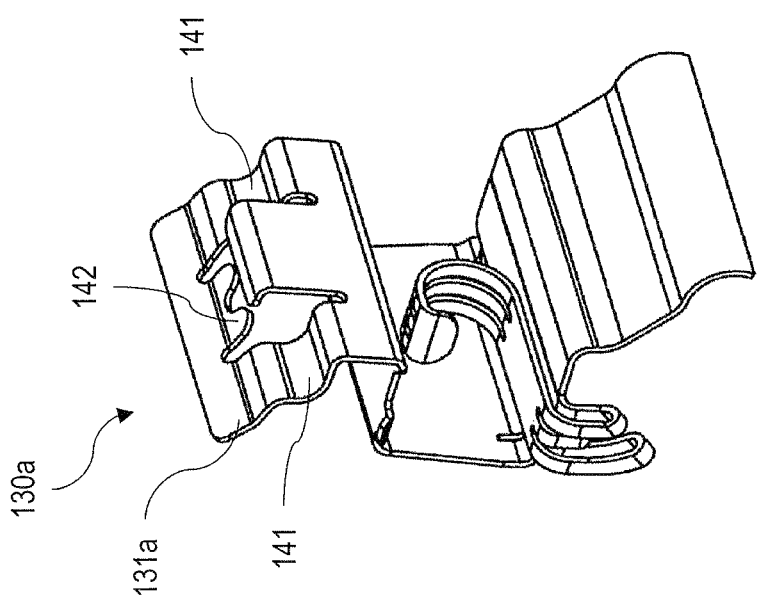

FIGS. 22 and 23 show two guides 130a and 130b according to the second exemplary embodiment, wherein the basic body 131a and 131b is adapted accordingly for attachment to the brake carrier 20. Fixing lugs 141 are thus provided in FIG. 22, which lugs ensure this attachment in interaction with at least one latching claw 142. Two lateral latching claws 143 are provided in FIG. 23 for the same purpose and likewise engage directly on the brake carrier 20.

FIGS. 24 and 25 show guides 130c with reset devices acting in opposite directions, the basic bodies 131c of which are connected in a single U-shaped piece via a connecting bracket 145. Attachment projections 147 are present in this case, which are each oriented symmetrically inwards into the U-shaped basic body 131c and are suitable for attachment to the brake carrier 20. The guides 30 shown in FIG. 2 can be replaced by a single element in this way, for example, which is advantageous for assembly and disassembly in production and maintenance. A one-piece common basic body of this kind can be provided for all described embodiments of guides with reset devices.

Exemplary Embodiment 4

The fourth exemplary embodiment according to one of FIGS. 26 to 32 differs from the previous exemplary embodiments in that the guide 330 has a reset device, which instead of an elastically deformable region 33, 133, 233 and a separate plastically deformable region 37, 137, 237 now has a single region 333, 337 for the elastic and plastic deformability. In this way this sensitive region 333, 337 can be arranged completely within the receiving region 332 of the guide 300 and the retaining tongue 12 of the brake pad carrier 11 can be positioned upstream in the actuation direction B. This not only saves installation space, but also reduces the risk of damaging the region 333, 337 when exchanging worn parts of the disc brake 1. Here the region 333, 337 still remains connected to the basic body 331 of the guide 330 via the transition region 335.

Moreover, the retaining tongue 12 has a stepped recess 12a instead of an edge facing the region 333, 337 in the actuation direction B, due to which two edges are created, which span a diagonal between them that corresponds to the slope of the adjoining loop-like region 333, 337. Tilting of the retaining tongue 12 on the region 333, 337 is prevented by this. Self-evidently the recess 12a does not necessarily have to be stepped, but can also be beveled, concave or convex, wherein such a form of the retaining tongue 12 can be applied to all exemplary embodiments described here.

Figures 26, 27:
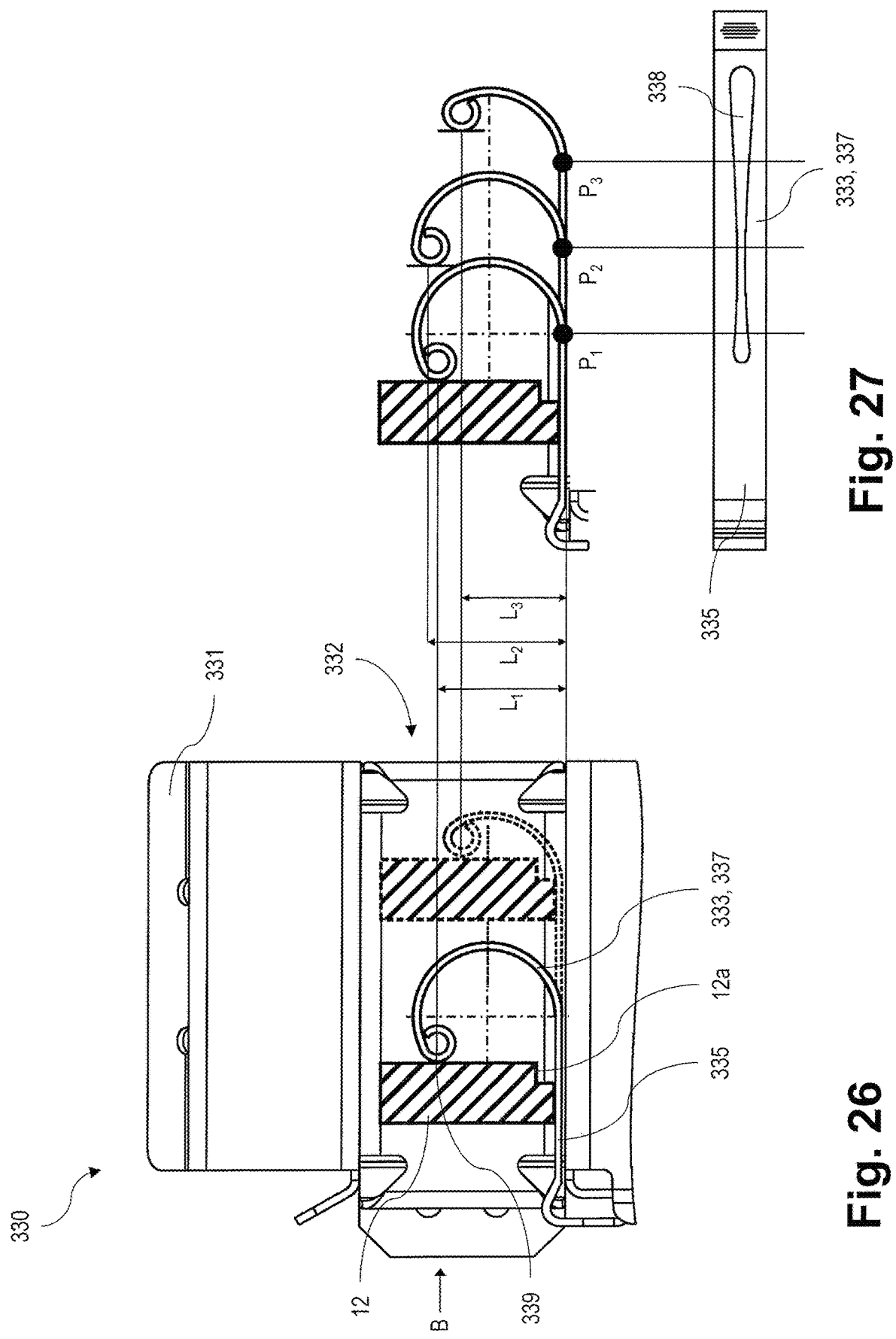
FIGS. 26, 27 are cross sections through a fourth guide with a reset device in states of plastic and elastic deformation.

FIGS. 26 and 27 indicate the course of the elastic and plastic deformation of the region 333, 337.

In FIG. 26 the region 333, 337 is shown in two states: on the left the region 333, 337 is shown by continuous lines and in a basic state, in which the retaining tongue 12 is not yet displaced in the actuation direction B; on the right the region 333, 337 is shown by dashed lines and is in a plastically deformed state, in which the retaining tongue 12 is displaced owing to wear of the brake pad 13 so far in the actuation direction B that the region 333, 337 experiences plastic deformation to compensate for the wear.

In FIG. 27 the states described above, basic state and two other plastically deformed states of the region 333, 337 are shown. Upon actuation of the disc brake 1, the brake pad carrier 11 and thus also its retaining tongue 12 are moved in the actuation direction B. Starting from the basic state, the region 333, 337 here reaches the first plastically deformed state (P2), which corresponds to a first wear compensation. As wear of the brake pad advances further, another plastically deformed state (P3) occurs, which corresponds to a further wear compensation. A lever point $P_1$, $P_2$, $P_3$ along the region 333, 337 and a related lever arm $L_1$, $L_2$, $L_3$ is associated with each of these states. Furthermore, by means of the plan view of the regions 333, 337, 335 shown below these states, their material thickness at the respective lever point $P_1$, $P_2$, $P_3$ is indicated. The material thickness of the regions 333, 337, 335 is determined here by a recess 338 that varies along their longitudinal extension. The deformability of the region 333, 337 by means of the retaining tongue 12 is thus determined by the lever point $P_1$, $P_2$, $P_3$ on the retaining tongue 12, the lever arm $L_1$, $L_2$, $L_3$ perpendicular to the actuation direction B from the lever point $P_1$, $P_2$, $P_3$ to the point of engagement of the retaining tongue 12 on the engagement lip 339, and the material and the cross section of the region 333, 337 from the respective lever point $P_1$, $P_2$, $P_3$ to the point of engagement of the retaining tongue 12 on the engagement lip 339. The wear states shown in FIG. 27 are only examples of possible plastic deformation states. Intermediate states result in each case depending on the actual wear.

Exemplary Embodiment 5

FIGS. 28 to 30 show two guides 330a, 330b, 330c formed in one piece with differently formed regions 333, 337, 335, wherein the reset device connects alternatively to the rear surface R of the guide and rolls out on this.

FIG. 28 thus shows for each of the two guides a single or more recess 338a in the shape of an hourglass in the regions 333, 337, 335, by which a continuous course of the deformability can preferably be achieved. Alternatively the one or more hourglass-shaped recess 338a in the regions 333, 337, 335 can be configured so that a progressive course of the deformability (increase in reset force as the wear advances) can be achieved. In FIG. 29, on the other hand, several recesses 338b in the manner of belt holes are provided, due to which a discrete progression of deformability can be achieved. Although FIG. 30 also shows several recesses 338c, these are located on the outer edges of the regions 333, 337, 335. Naturally only the region 333, 337 can have recesses also, so that the transition region 335 does not require processing in this regard.

Figure 31:
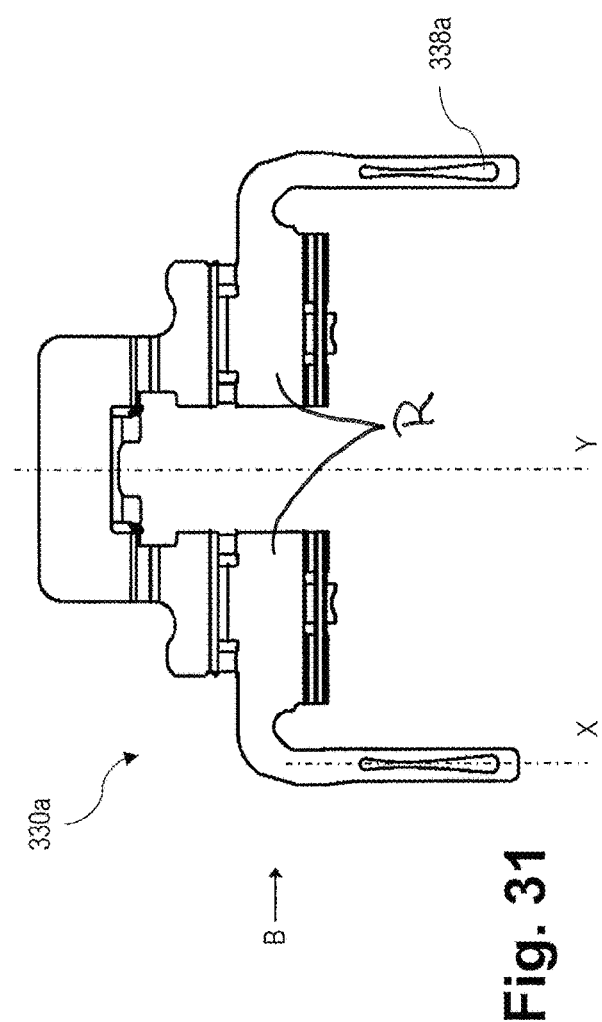
FIGS. 31, 32 are a manufacturing method of the reset devices of the fifth guide.
Figure 32:
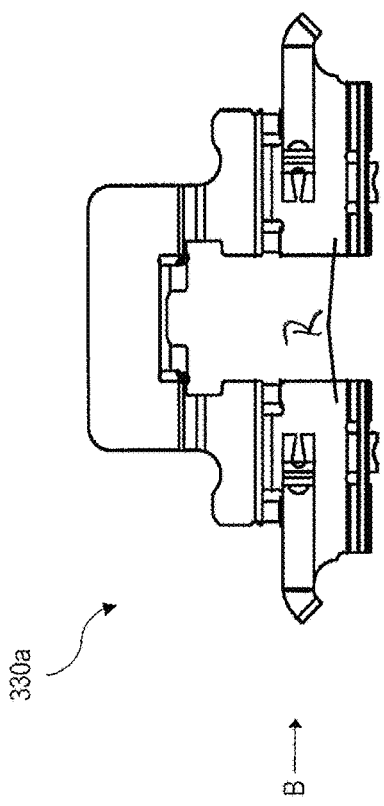

FIGS. 31 and 32 show a manufacturing method of the reset devices of the fourth guide 330 taking the example of the reset devices with the regions 333, 337, 335 and the recesses 338a from FIG. 28. In FIG. 31 the reset device is cut out in such a way that its longitudinal axis X runs substantially parallel to the central axis Y of the guide 330a. Then, as shown in FIG. 32, the reset device is bent at right angles and oriented parallel to the actuation direction B. The material wastage is thus reduced.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A disc brake for a motor vehicle comprising: a guide in which at least one brake pad assembly is guided movably in a braking manner, wherein the at least one brake pad assembly comprises a brake pad carrier to which a vehicle brake pad is attached, which can be brought into interaction with a brake disc for achieving a braking effect, wherein the brake pad carrier comprises at least one retaining tongue, wherein the guide comprises at least one receiving region and wherein the at least one receiving tongue can be received, guided in an actuation direction, in the at least one receiving region, wherein a reset device is in contact with the at least one retaining tongue, by means of which the reset device is configured to apply a reset force acting opposite to the actuation direction as a result of an elastic deformation by brake active deflection of the brake pad assembly, wherein the reset device has an elastically deformable region for resetting the brake pad carrier, and a plastically deformable region for a permanent adjustment to a wear of the vehicle brake pad, wherein the reset device is only then plastically deformable due to a force acting thereon in the actuation direction along a surface of the receiving region when the reset device has assumed a predetermined, exclusively elastic deformation due to the force acting thereon in the actuation direction force, wherein the plastically deformable region is formed as a loop and is in direct contact with the at least one retaining tongue and can roll out along the surface during the plastic deformation; wherein for the plastic deformation of the plastically deformable region, the at least one retaining tongue contacts and slides on the plastically deformable region, so that the plastically deformable region is reshaped according to contact with the at least one retaining tongue.

2. The disc brake according to claim 1, wherein the plastically deformable region is also the elastically deformable region at the same time, wherein a recess in a longitudinal direction of the region defines the deformability.

3. The disc brake according to claim 1, wherein the elastically deformable region extends in a different direction from the plastically deformable region.

4. The disc brake according to claim 1, wherein the elastically deformable region has at least two projections.

5. The disc brake according to claim 1, wherein the reset device has a stop, which is able to limit a spring path of the elastically deformable region so that any further movement of the at least one retaining tongue in the actuation direction leads to a plastic deformation of the plastically deformable region.

6. The disc brake according to claim 1, wherein the reset device has at least two elements connected to one another, wherein only one of the elements has the plastically deformable region.

7. The disc brake according to claim 1, wherein the reset device is formed from sheet metal, which has a projecting, loop-shaped region including the plastically deformable region protruding into the receiving region, wherein a recess in the sheet metal defines the elastic and plastic deformability.

8. A brake pad assembly for a disc brake comprising: a brake pad assembly having a brake pad carrier, to which a vehicle brake pad is attached, which can be brought into interaction with a brake disc for achieving a braking effect, wherein the brake pad carrier has at least one retaining tongue and wherein the guide has at least one receiving region, wherein the at least one retaining tongue can be received, guided in an actuation direction, in the at least one receiving region, wherein a reset device is in contact with the at least one retaining tongue, via which the reset device is configured to apply a reset force acting opposite to the actuation direction as a result of an elastic deformation by brake active deflection of the brake pad assembly, wherein the reset device has an elastically deformable region for resetting the brake pad carrier, and a plastically deformable region for a permanent adjustment to a wear of the vehicle brake pad, wherein the reset device is only then plastically deformable due to a force acting thereon in the actuation direction along a surface of the at least one receiving region when the reset device has assumed a predetermined, exclusively elastic deformation due to this force, wherein the plastically deformable region is formed as a loop and is in direct contact with the at least one retaining tongue and can roll out along the surface during the plastic deformation; wherein for the plastic deformation of the plastically deformable region, the at least one retaining tongue contacts and slides on the plastically deformable region, so that the plastically deformable region is reshaped according to contact with the at one retaining tongue.

9. The brake pad assembly according to claim 8, wherein the reset device in the elastically deformable region for resetting the brake pad carrier and/or in the plastically deformable region for permanent adaptation to a wear of the vehicle brake pad to obtain a continuous or progressive course of the deformability for the at least one guide (i) has a hourglass-shaped recess, or (ii) a recess on outer edges of the plastically and/or elastically deformable regions.

* * * * *